United States Patent

[11] 3,581,206

| | | |
|---|---|---|
| [72] | Inventor | Siegfried Strohm<br>Stuttgart-Stammheim, Germany |
| [21] | Appl. No. | 813,036 |
| [22] | Filed | Apr. 3, 1969 |
| [45] | Patented | May 25, 1971 |
| [73] | Assignee | Firma Dr.-Ing. h.c. F. Porsche RG,<br>Stuttgart/Zuffenhausen, Germany |
| [32] | Priority | Apr. 6, 1968 |
| [33] | | Germany |
| [31] | | P 17 73 152.1 |

[54] ELECTRONICALLY CONTROLLED SPEEDOMETER WITH MAXIMUM SPEED INDICATOR
5 Claims, 2 Drawing Figs.

[52] U.S. Cl.................................................. 324/169,
324/78, 324/103, 317/5, 317/19
[51] Int. Cl.................................................. G01p 3/48
[50] Field of Search........................................ 324/70, 78,
99, 100; 346/3; 235/103; 317/5, 19

[56] References Cited
UNITED STATES PATENTS

| | | | |
|---|---|---|---|
| 3,109,140 | 10/1963 | Chin................................. | 324/70 |
| 3,402,327 | 9/1968 | Blackburn......................... | 324/70UX |
| 3,406,570 | 10/1968 | White.............................. | 324/103 |

FOREIGN PATENTS

| | | | |
|---|---|---|---|
| 919,421 | 2/1963 | Great Britain.................. | 324/70 |

*Primary Examiner*—Michael J. Lynch
*Attorney*—Craig, Antonelli, Stewart and Hill ABSTRACT: An electronically controlled speedometer wherein the inductive impulses from the ignition coil whose frequency is proportional to the speed of the motor are shaped and integrated to form a control signal which is applied to a servoamplifier connected to a servomotor forming a servo loop, the servomotor driving the instantaneous speed indicator dial which in turn drags a maximum speed dial therewith in the direction of increasing speed indication, and a critical speed indicator responsive to a critical value of said control signal for interrupting the ignition circuit.

Inventor:
SIEGFRIED STROHM

By: Craig, Antonelli, Stewart & Hill
ATTORNEYS

ELECTRONICALLY CONTROLLED SPEEDOMETER WITH MAXIMUM SPEED INDICATOR

The present invention relates to a speedometer including an indicator device for indicating the maximum utilized speed, particularly for internal combustion engines of automotive vehicles, and an electronically controlled measuring device cooperating with an inductive impulse transmitter, such as the ignition coil or the like, for providing an instantaneous measurement of speed.

In conventional electronically controlled speedometers of the above-mentioned type, the control voltage available for displacing the speed indicator hand is insufficient for also actuating concomitantly the indicator hand designating maximum speed. Therefore, it was necessary to readjust the so-called drag hand or drag indicator by hand, or to resort to mechanical indication. However, the known devices of this type exhibit the disadvantage of being inaccurate in their indication, which inaccuracy amounts to up to 15 percent of the actual value. This disadvantage, therefore can no longer be tolerated in connection with the engine speeds customary nowadays, which range around or above 10,000 r.p.m.

In contrast thereto, the objective of the present invention is to create an electronically controlled speedometer provided with an accurately operating indicator device, wherein the customary dimensions of such measuring apparatus can be maintained.

In accordance with the invention, this is accomplished by providing, for driving the hands of the measuring unit, a reversible servomotor with a followup servo control responding to the integrated control voltage supplied by the speed detector.

By employing a servoamplifier in the measuring unit, it is possible, with only a small space requirement, to produce the required dragging force for an indicator hand to be entrained and carried along by the main speed indicator hand.

There is no danger of obtaining any undesirably high measuring inaccuracies by the measuring value detection and transmission according to this invention. Accordingly, a speedometer is provided which indicates all desired values with a reasonable degree of expenditure. Preferably, the speed detector of the measuring unit is formed by a pulse shaping stage connected to the output of the impulse transmitter; this pulse shaping stage cooperates with an integrating member and is connected to a voltage converter providing a stabilized output voltage.

The arrangement can furthermore be executed so that the control voltage transmitted by the integrating member is fed to the servo control loop and optionally is also supplied to the switching network of a critical speed detector and indicator. Thereby, it is made possible without any large additional expenditure to protect the engine from the possible stripping of gears.

A simple construction of the speedometer is obtained by mounting the electronic structural components of the follower unit of the speed detector and of the voltage transformer on a common wiring panel, which panel carries simultaneously the servomotor and the reduction gear for the indicator hand drive coupled therewith. It is an object of the present invention to provide an electronically controlled speedometer including a maximum speed indicator which eliminates the disadvantageous features inherent in similar devices known heretofor.

It is another object of the present invention to provide an electronically controlled speedometer of the type described in an extremely compact and inexpensive form.

These and other objects, features and advantages of the present invention will become more apparent from the following detailed description of the invention when taken with the accompanying drawing, wherein.

Figure 1:
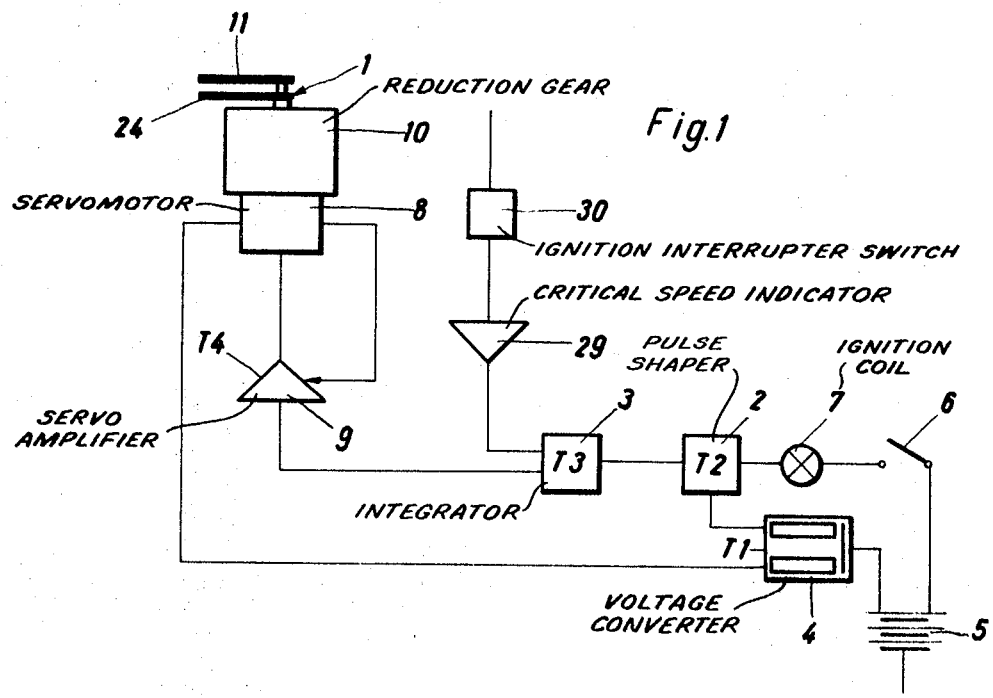
FIG. 1 shows a schematic circuit diagram of the speedometer of this invention with the details of the electrical unit of an automotive vehicle pertaining thereto.

Referring now to the drawing wherein in the respective views similar reference numerals are utilized to designate corresponding elements wherever possible, and particularly to FIG. 1, the speedometer 1 is driven by an electronic measuring unit consisting of a speed detector 2, in the form of a pulse shaping device, and an integrating member 3. The pulse shaping device 2 is connected to a voltage converter 4 having a predetermined stabilized output voltage. The voltage converter 4 is conductively connected with the vehicle battery 5, from where the ignition coil 7 receives its current by way of the ignition switch 6. The ignition coil 7 serves an inductive pulse transmitter for the pulse shaping device 2 providing thereto a signal whose frequency is representative of the speed of the motor.

A reversible servomotor 8 is connected to the voltage converter 4, which provides thereto an output voltage which is likewise fixedly predetermined; and, this servomotor 8 is controlled by a servo unit 9, which is operated upon by the control voltage derived from the integrating member 3 and a feedback voltage derived from the servomotor 8 proportional to the driven position thereof. Via a reduction gear 10 of a conventional construction, the servomotor 8 drives the hand 11 for indicating the instantaneous speed.

Figure 2:
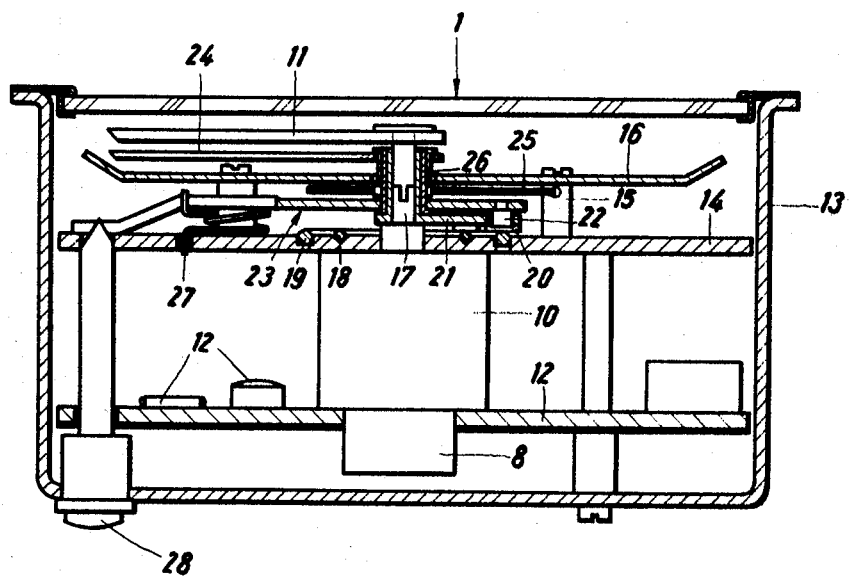
FIG. 2 is a longitudinal sectional view of the speedometer of the invention including a maximum speed drag hand.

Looking now to the device embodying the present invention, as illustrated in FIG. 2, the components 12 of the transistor circuits T1, T2, T3 and T4, i.e., the voltage converter 4, the pulse shaping device 2, the integrating member 3 and the servo unit 9, are attached to a switching panel 12' carrying simultaneously the servomotor 8 and the reduction gear 10. An additional panel 14 is disposed in the tank-shaped housing 13 of the speedometer 1, in spaced relationship to the switching panel 12'. The disc 16 having a graduated scale is attached to this panel 14 by way of supports 15. Concentrically with respect to the axis of the indicator hand drive shaft 17, a contact deck 18 and an annular resistor 19 for generating the variable feedback signal to the servo unit 9 are embedded in the panel 14. The contact deck 18 cooperates with a wiper 20, which is attached to a cam 21, the latter rotating together with the indicator hand drive shaft 17. The pin 22 of a conventional lifting device 23 for a drag hand 24 engages the cam 21 so as to be driven thereby only in the clockwise direction. The lifting device 23 further comprises a serrated click-stop device 25 secured to one of the supports 15 and engaging with the bearing sleeve 26 of the drag hand 24, as well as a spring 27 biasing a ratchet gear with a key 28 providing the stop which upon release will result in the return of the indicator hand.

When the internal combustion engine is in operation, i.e., when the ignition switch 6 is closed, the inductive voltage with superimposed impulses at a frequency proportional to engine speed derived from the ignition coil 7 is fed to the pulse shaping device 2 and integrated in the integrating member 3 to provide a control voltage whose magnitude is proportional to the engine speed. By means of the integrated control voltage, the servomotor 8 is actuated via the servo unit 9 which drives the indicator hand across the scale. By integrating the respective instantaneous control voltage, each position of the hand 11 corresponds to a quite specific associated speed which can be read off from the graduated scale on disc 16. When the hand 11 is deflected, the indicator hand 24 is simultaneously entrained by way of the lifting device 23 in engagement with the cam 21, and the respectively attained maximum speed is recorded. Due to the click-stop device 25 engaging with the sleeve 26, the drag hand 24 will be retained at its maximum driven position even after the main hand 11 drops back.

In order to avoid stripping the gears of the engine, it is moreover possible to provide a critical speed indicator 29 which shuts off the engine by way of an ignition interrupter switch 30. The critical speed indicator 29 responds to a predetermined magnitude of control voltage derived from the integrating member 3 to operate the switch 30.

The invention is not limited to the illustrated embodiment. Thus, for example, in place of the ignition coil, and independently effective inductive component can also serve as the pulse transmitter for the speedometer, which component cooperates, for example, with one of the shafts of the internal combustion engine.

While I have shown and described only one embodiment in accordance with the present invention, it is understood that the same is not limited thereto, but is susceptible of numerous changes and modifications as known to a person skilled in the art, and I therefore do not wish to be limited to the details shown and described herein but intend to cover all such changes and modifications as are within the scope of those skilled in the art.

I claim:

1. An electronically controlled speedometer for indicating the speed of a motor having an electrical control system including an ignition coil, comprising:
   indicating means driveable to selective positions indicative of instantaneous speeds in a range of speeds including a rotatable speed indicating dial,
   a reversible servomotor connected through a reduction gear arrangement to said speed indicating dial for effecting a driving thereof to said selective positions in response to a control signal,
   a servoamplifier connected to said servomotor to form a servo loop therewith,
   pulse transmitter means connected to said ignition coil for generating a pulse train whose frequency is proportional to the speed of said motor,
   integrator means connected between said pulse transmitter means and said servoamplifier for generating said control signal having a magnitude proportional to the speed of said motor, and
   a rotatable drag dial for indicating maximum speed, a cam member driven from said reversible servomotor through said reduction gear arrangement, and a lifting device carrying a pin contacting said cam member so as to be driven thereby only in one direction, said lifting device being connected to said drag dial to drive said drag dial in rotation therewith.

2. An electronically controlled speedometer as defined in claim 2, wherein said servomotor includes feedback means for providing a feedback voltage proportional in magnitude to the increasing speed indication of said speed indicating dial, said feedback means being connected to said servo amplifier to provide said feedback voltage in control thereof and including an elongated resistance element having a voltage source connected thereto, said cam member carrying a wiper contacting the surface of said resistance element, said wiper being electrically connected to an input of said servoamplifier.

3. An electronically controlled speedometer as defined in claim 2, wherein said pulse transmitter means comprises a detector connected to said ignition coil for detecting the inductive impulses generated in said ignition coil during running of the motor, said servoamplifier, said detector, said servomotor and said integrator means being mounted on a common wiring panel.

4. An electronically controlled speedometer as defined in claim 3, wherein said reduction gear arrangement includes a drive shaft connected to said rotatable speed indicating dial and said cam member, said lifting device being freely rotatable on said drive shaft with respect to said cam member and said drive shaft, said elongated resistance element being annular and concentric with said drive shaft.

5. An electronically controlled speedometer as defined in claim 4, wherein a manual spring ratchet member is connected to said lifting device to effect selective return of said drag dial to an initial position.